United States Patent [19]

Sugimoto et al.

[11] Patent Number: 4,746,268
[45] Date of Patent: May 24, 1988

[54] END FACE MECHANICAL SHAFT SEAL FOR USE IN HYDRAULIC MACHINES AND SEAL RING ASSEMBLY FOR USE IN THE SHAFT SEAL

[75] Inventors: Osamu Sugimoto, Suita; Teiji Horita, Hikone; Katsutoshi Nii; Koozi Aizawa, both of Hitachi; Kazuhiko Kawaike; Ichiro Hitomi, both of Katsuta; Hisao Inoue, Hitachi, all of Japan

[73] Assignees: Hitachi, Ltd., Tokyo; The Kansai Electric Power Co. Ltd., Osaka, both of Japan

[21] Appl. No.: 79,043

[22] Filed: Jul. 29, 1987

[51] Int. Cl.[4] .............................................. F04D 29/08
[52] U.S. Cl. ................................. 415/170 R; 277/81 S
[58] Field of Search .......................... 415/170 R, 174; 277/81 S, 81 R, 96, 96.1, 38, 39, 40, 41

[56] References Cited

U.S. PATENT DOCUMENTS

| 3,599,990 | 8/1971 | Greiner et al. | 277/81 S |
|---|---|---|---|
| 4,395,048 | 7/1983 | Timmermans et al. | 415/170 A |
| 4,410,188 | 10/1983 | Copes | 277/81 S |

FOREIGN PATENT DOCUMENTS

| 958701 | 12/1950 | France | 277/81 |
|---|---|---|---|
| 117854 | 9/1979 | Japan | 277/96.1 |
| 920,892 | 3/1963 | United Kingdom | 277/96.1 |
| 2071231 | 9/1981 | United Kingdom | 277/81 R |

Primary Examiner—Robert E. Garrett
Assistant Examiner—John T. Kwon
Attorney, Agent, or Firm—Fay, Sharpe, Beall, Fagan, Minnich & McKee

[57] ABSTRACT

An end face mechanical shaft seal for use in a hydraulic machine includes a seal ring assembly detachably secured to a seal casing and having a sealing face which makes a sliding and fluid-tight contact with an annular seat face presented by a flange on the rotor shaft. The seal ring assembly is of a cartridge type which includes a ring casing having an annular groove formed in one end surface thereof and a seal ring partly received in the groove and fixed to the ring casing by an adhesive. Each of the ring casing and the seal ring is constituted by a plurality of arcuate sections or segments which are connected together in the circumferential direction.

15 Claims, 7 Drawing Sheets

END FACE MECHANICAL SHAFT SEAL FOR USE IN HYDRAULIC MACHINES AND SEAL RING ASSEMBLY FOR USE IN THE SHAFT SEAL

FIELD OF THE INVENTION

The present invention relates to an end face mechanical shaft seal for use in large-scale hydraulic machine such as water turbines and pumps and adapted for preventing leak of fluid along the rotor shaft of such a machine. The invention is also concerned with a cartridge type seal ring assembly for use in this type of shaft seal.

DESCRIPTION OF THE PRIOR ART

A typical conventional end face shaft seal for use in large-scale hydraulic machine is disclosed in Water Power, pp 309–314, published on August, 1973, as well as in Japanese Utility Model Laid-Open Publication No. 12678/1983 (Post-Exam. Publication No. 14377/1987).

Figure 10:
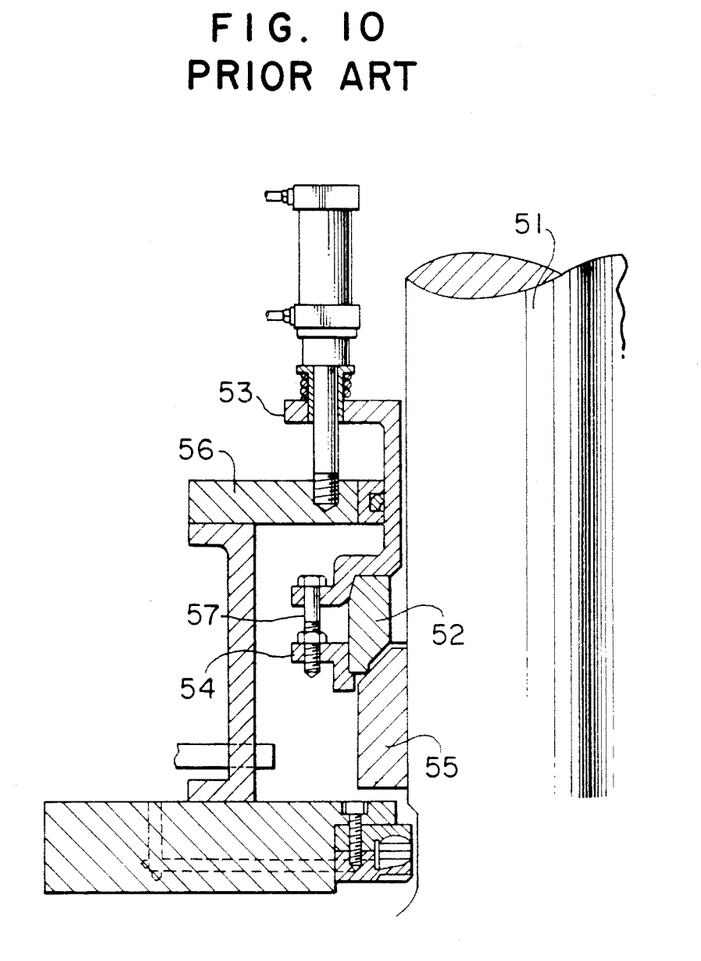
FIG. 10 is a fragmentary vertical sectional view of the prior art discussed above.

This known shaft seal is shown in FIG. 10 and has an annular flange 55 fixed to the rotor shaft 51 of a hydraulic machine and presenting a seat surface, an annular casing 56 surrounding the flange 55, an annular seal ring holding member 53 movable in the axial direction of the rotor shaft 51, an annular seal ring 52, a clamping ring 54 for securing the seal ring 52 to the seal ring holding member, and bolts 57 for fixing the clamping ring to the seal ring holding member such that the seal ring is clamped between the clamping member and the seal ring holding member. The seal ring 52 is composed of a plurality of segments each having a sector or arcuate form. These segments are held between the seal ring holding member 53 and the clamping ring 54 so as to complete the seal ring 52 which is continuous in the circumferential direction. In this shaft seal, it is essential that all the segments of the seal ring 52 are clamped uniformly. This is because, if the end faces of the segments are not flush with each other, the seal face of the seal ring becomes unsmooth and discontinuous in the circumferential direction, undesirably allowing an internal fluid to leak therealong. In order to avoid such inconveniences, it is essential that all the segments are uniformly clamped and that the segments are precisely finished to have the required thickness in the axial direction.

The segments of the seal ring are usually made from fiber-reinforced plastics, fired carbon or ceramics. It is rather difficult to attain high dimensional precision with these types of materials. In consequence, the cost of production of the seal ring is undesirably raised. Another problem encountered by this known shaft seal is that, since the segments of the seal ring 52 are directly clamped between the seal ring holding member 53 and the clamping ring 54, the segments are liable to be crushed or broken due to an excessive tightening force of the clamping ring 54, particularly when the segments are made of a comparatively fragile material such as carbon or ceramics.

SUMMARY OF THE INVENTION

Accordingly, an object of the present invention is to provide a seal ring assembly of cartridge type having a simplified construction but yet capable of readily presenting a smooth seal face with a high dimensional precision, thereby overcoming the above-described problems of the prior art.

Another object of the present invention is to provide an improved end face mechanical shaft seal for use in hydraulic machines, which incorporates the seal ring assembly mentioned above.

According to one aspect of the present invention, there is provided a seal ring assembly for use in an end face mechanical shaft seal. The assembly comprises an annular ring casing having a substantially annular end face formed therein with a substantially annular groove and a seal ring partly received in the groove and secured to the ring casing by an adhesive. The seal ring is formed by a plurality of segments each having a substantially arcuate cross-section, substantially cylindrical radially inner and outer surfaces, axial end faces and side faces. The segments are disposed in the annular groove with one of the end faces of each segment received in the groove and the other end face being offset from the end face of the ring casing axially outwardly thereof. The segments are arranged in circumferentially side-by-side abutting relationship with each other to form the seal ring. The other end faces of respective segments are included in a substantially the same plane to provide a substantially smooth and circumferentially substantially continuous sealing surface.

According to another aspect of the present invention, there is provided an end face mechanical shaft seal for use in a hydraulic machine, which shaft seal incorporates the seal ring assembly of the structure pointed out above.

The present invention offers the following advantages:

(1) The seal ring assembly is of cartridge-type and thus can be mounted on and demounted from the shaft seal very easily;

(2) Since the segments constituting the seal ring are held by the ring casing, the segments can be mounted and tightened without any risk of damage even when the segments are made of a comparatively fragile material such as carbon or ceramics;

(3) The segments of the seal ring need not be finished so precisely. Namely, the end faces of the segments may be machined to present flush end faces even after the segments are assembled in the ring casing, so that the whole seal ring assembly can exhibit a smooth seal face. In consequence, the production cost is considerably reduced and a high sealing effect is obtained from the beginning of the operation thereof; and (4) It is possible to obtain a seal ring having a large diameter.

These and other objects, features and advantages of the present invention will become more apparent from the following description.

DESCRIPTION OF THE PREFERRED EMBODIMENTS

Figure 9:
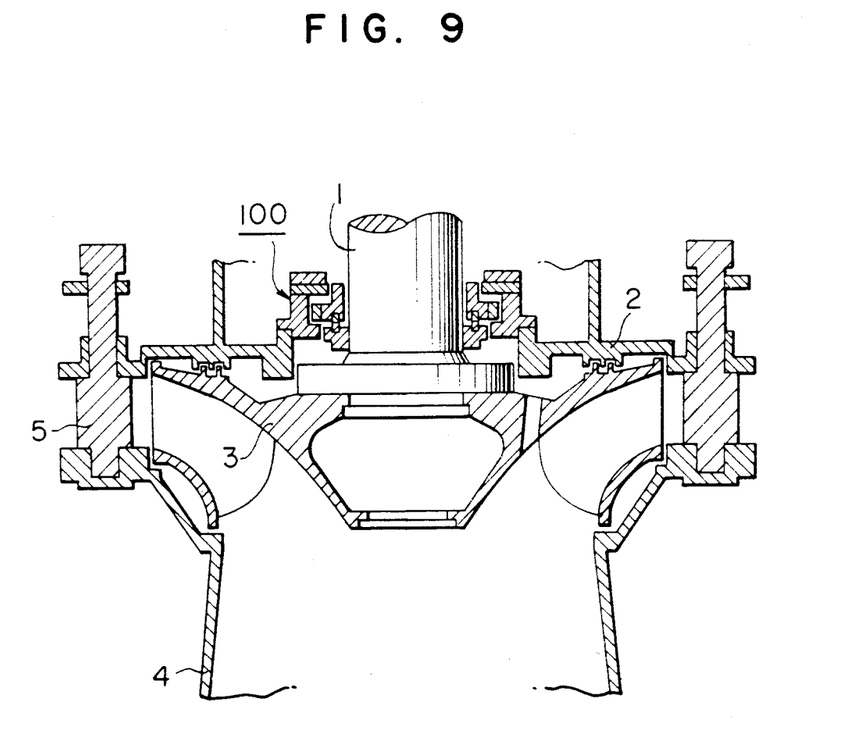
FIG. 9 is a fragmentary vertical sectional view of a water turbine incorporating the shaft seal of the present invention.

Referring first to FIG. 9 which is a fragmentary vertical sectional view of a water turbine to which the present invention is applied, the water turbine has a rotor shaft 1 which is connected at its one end to an impeller 3. A draft tube 4 constituting a water passage is provided with guide vanes 5 disposed in the vicinity of the impeller 3 and adapted for regulating the flow rate of water. An end face mechanical shaft seal, generally designated by 100, is provided to prevent water from leaking through the clearance between a casing 2 and the rotor shaft 1.

Figure 1:
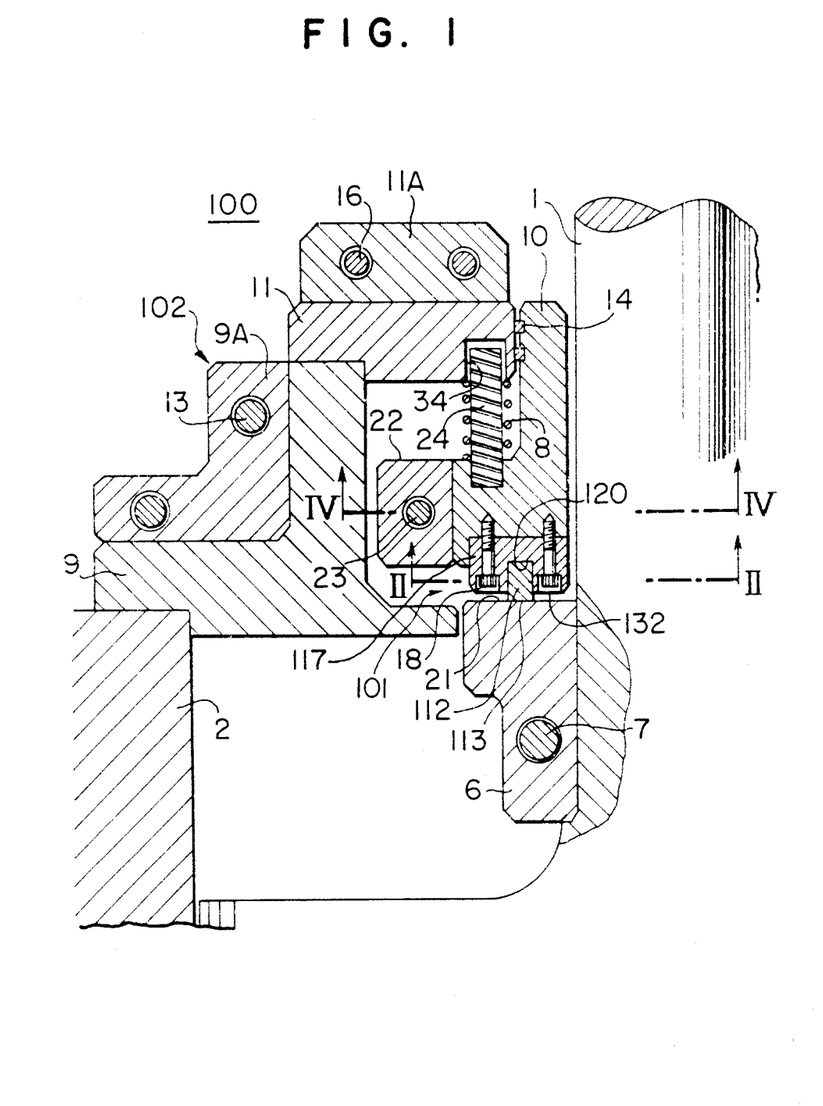
FIG. 1 is a fragmentary sectional view of an embodiment of the shaft seal in accordance with the present invention.

An embodiment of the end face mechanical shaft seal (referred to simply as "shaft seal", hereinafter) 100 is shown in FIG. 1 in fragmentary vertical section.

A substantially annular first member 6 is fixed to the rotor shaft 1 for rotation therewith. In the illustrated embodiment, the first member 6 is a flange. The flange 6 is composed of two halves each having a semi-circular form. These two halves are disposed so as to embrace the rotor shaft 1 and fixed together by means of bolts 7 which extend perpendicularly to the axis of the rotor shaft 1. The rotor shaft 1 of the water turbine incorporating the shaft seal to which the invention pertains usually has a very large diameter of, for example, 2 meters. It is therefore extremely difficult to prepare the flange 6 from a single piece of material and fix the same to the rotor shaft 1. Thus, a practical way of providing the flange is to form the flange 6 from two halves and then unite them with each other by means of the bolts 7 such that the flange 6 thus formed is integrally fixed to the rotor shaft 1.

One end face of the flange 6 provides a substantially annular seat surface 21. A seal ring 112 of a seal ring assembly is adapted to make a sliding contact with this seat surface 21, as will be described later.

An annular seal casing 102 is fixed to the water turbine casing 2. The seal casing 102 has an annular peripheral wall portion 9 and an annular cover portion 11. In the case of a large-sized water turbine, it is difficult to form each of such portions 9 and 11 as a unitary member. Therefore, the peripheral wall portion 9 and the cover portion 11 are respectively composed of two semi-circular halves or sections and these sections are united with each other by means of bolts 13 and 16, respectively, as is the case of the flange 6. The sections of the peripheral wall portion 9 are provided at their joint portions with lugs 9A secured thereto by welding. The opposing lugs 9A at both diametrical ends of the peripheral wall portion sections are fixed to each other by means of bolts 13 received in holes formed in these lugs, whereby both sections are united to each other to form a complete annular peripheral wall portion 9. Similarly, the two semi-circular sections of the cover portion 11 are fastened together at their lugs 11A by means of bolts 16 which extend through aligned holes formed in these lugs 11A.

Figure 4:
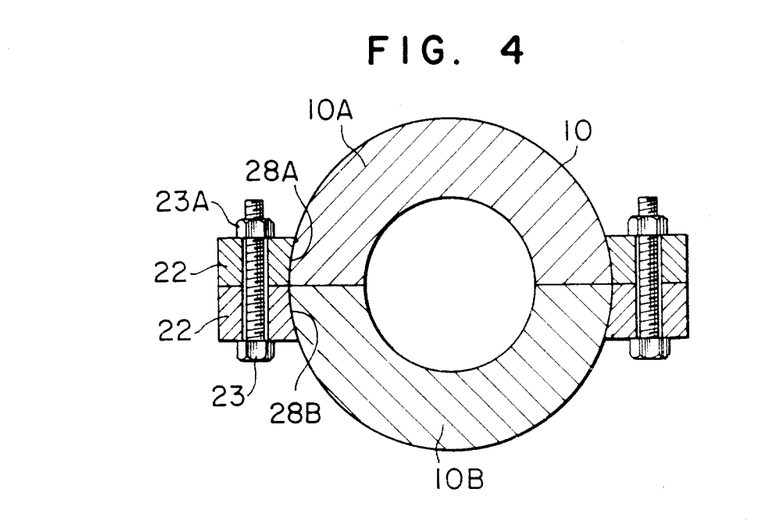
FIG. 4 is a sectional view taken along the line IV—IV in FIG. 1.

A substantially annular second member, which is in this case a seal ring holder denoted by numeral 10, is disposed on the inner peripheral edge of the cover portion 11 for movement in the axial direction of the cover portion 11. As will be seen from FIG. 4, the seal ring holder 10 is composed of semi-circular halves or sections 10A and 10B, lugs 22 which are secured to both circumferential ends of the outer surfaces of the sections 10A and 10B by welding as at 28A and 28B, bolts 23 extending through the holes formed in the lugs 22, and nuts 23A screwed to the bolts 23 to fasten both sections 10A and 10B together.

The seal ring holder 10 has a substantially L-shaped cross-section. An "O" ring 14 fits in an annular groove in the outer peripheral surface of an upper end portion of the seal ring holder 10. The "O" ring 14 slidably contacts with the inner peripheral surface of the cover portion 11 in a fluid-tight manner. The lower end portion of the seal ring holder 10 provides an annular flange to which are fixed one ends of a plurality of pins 24 which stand upright therefrom. The lower end surface of the cover portion 11 has guide holes 34 which slidably receive the other ends of the pins 24 such that the pins 24 are axially movable within these guide holes 34. A compression coil spring 8 is wound around each pin 24 so as to produce a downward force which acts to bias the seal ring holder 10 resiliently and downwardly. The pins 24 serve as stopper for preventing the seal ring holder 10 from rotating about its own axis. The pins 24 with the springs 8 wound thereon are arranged at suitable circumferential pitches.

A seal ring assembly 101 is detachably secured to the lower end surface of the seal ring holder 10 by means of bolts 18. As will be understood from FIGS. 1, 2 and 3, the seal ring assembly 101 has an annular ring casing 117 having a substantially annular end face 132 provided with a substantially annular groove 120 formed therein, and a seal ring 112 partly received in the groove 120 and fixed to the ring casing by means of an adhesive 124.

Figure 3:
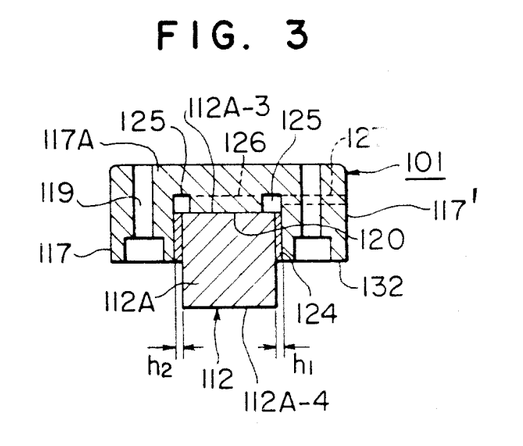
FIG. 3 is an enlarged sectional view taken along the line III—III in FIG. 2.

The seal ring 112 is composed of a plurality of segments 112A each having substantially cylindrical radially outer and inner faces 112A-1 and 112A-2, both axial end surfaces 112A-3 and 112A-4 and circumferential both end surfaces 112A-5 and 112A-6. Each of the segments has an arcuate cross-sectional shape take along a plane perpendicular to the axis of the seal ring 112. In the illustrated embodiment, the seal ring 112 is composed of four such segments 112A.

These segments 112A are disposed such that their one axial end faces 112A-3 are received in the groove 120 while the other end faces 112A-4 are offset axially outwardly from the end face 132 of the ring casing 117. These segments are arranged such that the adjacent circumferential end surfaces of each adjacent pair of segments abut each other. The other axial end faces 112A-4 of the segments 112A are substantially flush with each other to provide a substantially smooth annular sealing surface 113 which is substantially continuous in the circumferential direction.

The sealing surface 113 of the seal ring 112 makes a sliding contact with the seat face 21 of the flange 6 to provide a fluid-tight seal which effectively prevents the internal fluid from leaking through the clearance between the seal casing 102 and the peripheral surface of the rotor shaft 1.

Figure 2:
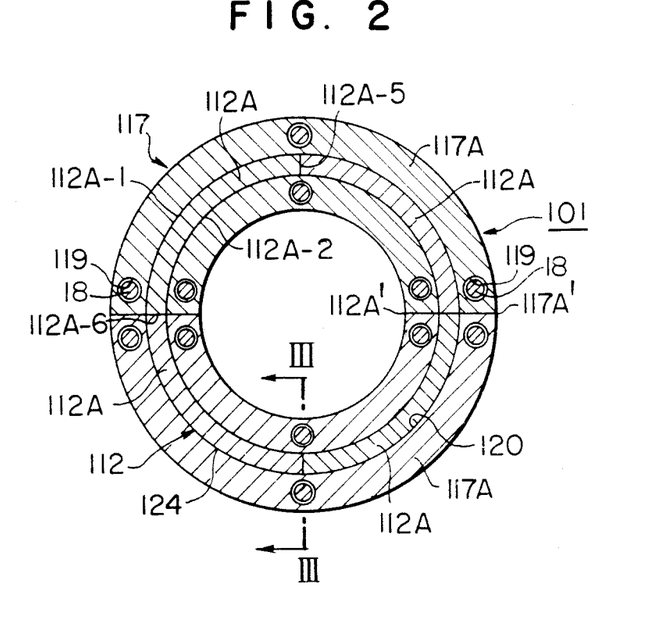
FIG. 2 is a sectional view taken along the line II—II in FIG. 1.

As will be seen from FIG. 2, in this embodiment, the ring casing 117 is composed of a pair of arcuate casing sections 117A, while the seal ring 112 is composed of four segments 112A as described before. The adjacent circumferential end surfaces of two sections 117A of the seal ring casing 117 abut each other, while the adjacent circumferential end faces of the adjacent segments of the seal ring 112 abut each other. Two abutting portions 117A′ of the casing sections 117A are disposed at the same circumferential positions as the abutting portions 112A′ of two adjacent pairs of segments 112A of the seal ring 112. In other words, the abutting portions 117A′ and the abutting portions 112A′ are aligned with each other in the radial direction.

The seal ring assembly 101 is detachably secured to the underside of the seal ring holder 10 by means of bolts 18 which extend through holes 119 which are formed in the ring casing 117 in the axial direction thereof. In this sense, the seal ring assembly 101 can be called as being of cartridge type.

The segments 112A are made from a material selected from a group consisting of carbon, ceramics (SiC or $Si_3N_4$) and a fiber-reinforced plastic. The adhesive 124 is, for example, an epoxy bond.

As will be seen from FIG. 3, the seal ring casing 117 and the seal ring 112 are so sized that clearances $h_1$ and $h_2$ are formed between the side surfaces of the groove 120 and the segment 112A. A layer of the bond 124 fills the clearances $h_1$ and $h_2$ thereby fixing each segment 112A to the wall of the ring casing 117.

In the embodiment shown in FIG. 3, a pair of narrow channels 125 are formed in the bottom of the groove 120 of the ring casing 117 and communicated with each other through a plurality of passages 126 which extend in the radial direction. The radially inner narrow channel 125 is communicated with the inner peripheral surface 117′ of the ring casing 117 through a plurality of further passages 127 which also extend in the radial direction through the ring casing 117. The narrow channels 125 and communicating radial passages 125, 127 enable any part of fluid coming into the gap between the bottom of the groove 120 of the ring casing 112 and the seal ring 112 to be discharged out the seal casing 117 through the radial passages 127. It is, therefore, possible to eliminate any risk for the segments 112A of the seal ring 112 to be forced out of the groove 120 due to pressure of the fluid in the groove 120. The narrow channels 125 also serve to provide a relief for the adhesive which effectively prevents the adhesive from being accumulated between the bottom of the groove 120 and the inner end face 112A-3 of each of the segments 112A. Thus, the segments 112A can directly contact with the bottom of the groove 120, so that later-mentioned fluctuation of the thicknesses of the segments 112A, which would otherwise occur after the bonding of the segments 112A to the seal ring 112, can be avoided.

A process for fabricating the seal ring assembly 101 will be described by way of example with reference to FIGS. 5A to 5E and FIG. 6.

Figure 5A:
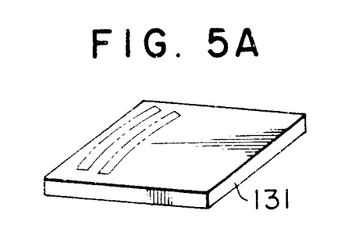
FIGS. 5A to 5E illustrate, in perspective views, steps of a process for the manufacture of a seal ring assembly.
Figure 5B:
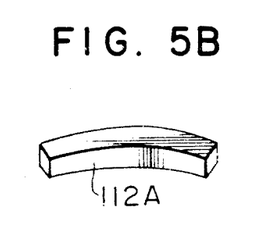
Figure 5C:
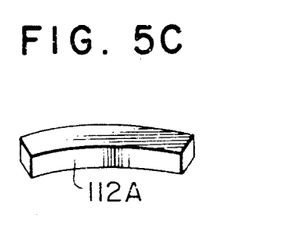
Figure 5D:
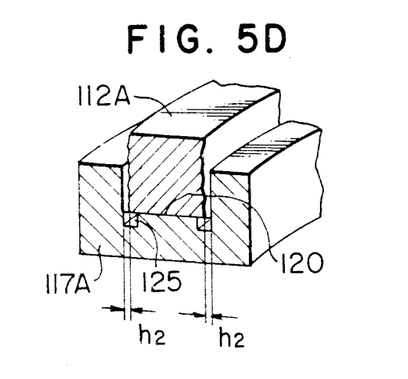
Figure 5E:
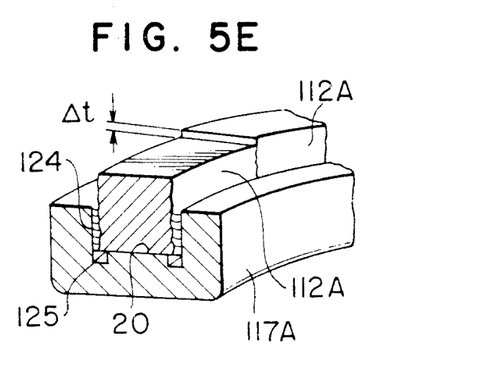

Segments 112A each having a construction as indicated by two-dot-and-dash lines in FIG. 5A are cut out from a sheet blank 131. When the sheet blank is made of a fiber-reinforced plastic or fired carbon, it is easy to cut out the segments 112A from the blank sheet. The segments 112A cut out from the blank sheet, each having a configuration as shown in FIG. 5B, are processed and assembled in accordance with steps shown in FIGS. 5C to 5D so as to complete a seal ring assembly. When the segments 112A are made of a ceramic material, the material is formed into such sheet blank 131 in a manner known per se by means of a hydrostatic press at normal temperature and the sheet blank 131 is machined, so that segments 112A as shown in FIG. 5B are obtained. Then, a non-pressurizing sintering is effected in the step shown in FIG. 5C whereby an ultra-hard segment 112A is obtained. In the next step shown in FIG. 5D, each segment 112A is placed on the ring casing 117 such that one end of the segment 112A is received in the groove 120 formed in the ring casing 117. The groove 120 has a radial width which is greater than the radial width of the segment 112A by an amount which is equal to the clearances $h_1$30 $h_2$, so that all the segments 112A can be placed in the groove 120 regardless of any slight fluctuation in the radial width of these segments 112A. It will be seen that the requirement for the precision of the radial width is not so strict. FIG. 5E shows a bonding step in which the segments 112A placed in the groove 120 are fixed in the groove 120 by bonding. This bonding can be effected by charging the clearances $h_1$ and $h_2$ with the adhesive 124. As the adhesive is cured in a certain curing time, the segments 112A are fixed to the ring casing 117.

Figure 6:
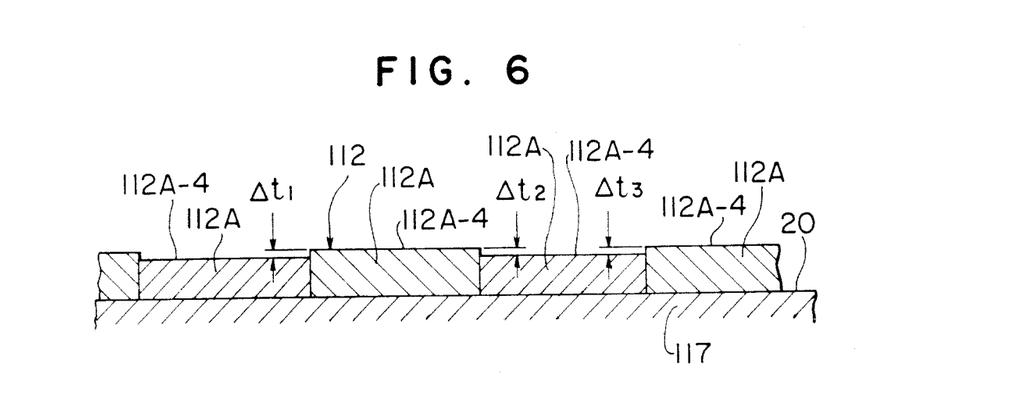
FIG. 6 is a developed view of a seal ring assembly illustrating a seal face which is unsmooth due to lack of uniformity of the thickness of segments.

When the dimensional precision of the segments is not so high in the axial dimension as in the case of the radial dimension, a fluctuation in the axial thickness is inevitably caused over a plurality of segments 112A, so that a step of a height $\Delta t$ is formed between adjacent segments 112A. FIG. 6 shows, in a somewhat exaggerated manner, the lack of uniformity in the thickness of the segments 112A. It will be seen that steps or height differences $\Delta t_1$, $\Delta t_1$ and $\Delta t_3$ are formed between adjacent segments 112A. Such height differences appear as steps in the end face of the seal ring 112. According to the invention, however, it is possible to remove such steps by mechanically finishing the end face of the seal ring and to obtain a substantially smooth end face 113 of the seal ring assembly which is continuous in the circumferential direction. It will be understood that such a machining is possible by virtue of the fact that all the segments 112A are fixedly received in the groove 120 of the ring casing 117. Alternatively, the smooth and continuous end face of the seal ring may be obtained by placing all the segments 112A on a flat leveled surface, conducting a machining such that all the segments 112A exhibit the same height and then placing the machined segments 112A in the groove 120 in the ring casing 117 as shown in FIG. 5D. Obviously, the machining of the end surfaces 112A-4 of the segments 112A is not necessary provided that the sheet blank 131 has been finished with a high degree of uniformity in the thickness to ensure that all the segments 112A cut out therefrom are exactly the same and, hence, the segments 112A provide smooth and continuous end face 113 of the seal ring in the assembled state.

In operation, the seal ring holder 10 is guided by the pins 24 for movement in the direction of axis of the rotor shaft 1 and is resiliently biased towards the flange 6 by means of the coil springs 8. In consequence, the seal ring 112 of the seal ring assembly 101 secured to the lower end of the seal ring holder 10 is held in sliding and fluid-tight contact with the seat face 21 of the flange 6. Meanwhile, the "O" ring 14 on the outer peripheral surface of the seal ring holder 10 makes a sliding and fluid-tight contact with the inner peripheral surface of the cover portion 11 of the seal casing 102, whereby any leak of fluid through the gap between the casing 2 of the impeller 3 and the rotor shaft 1, as shown FIG. 9, is prevented.

Figure 7:
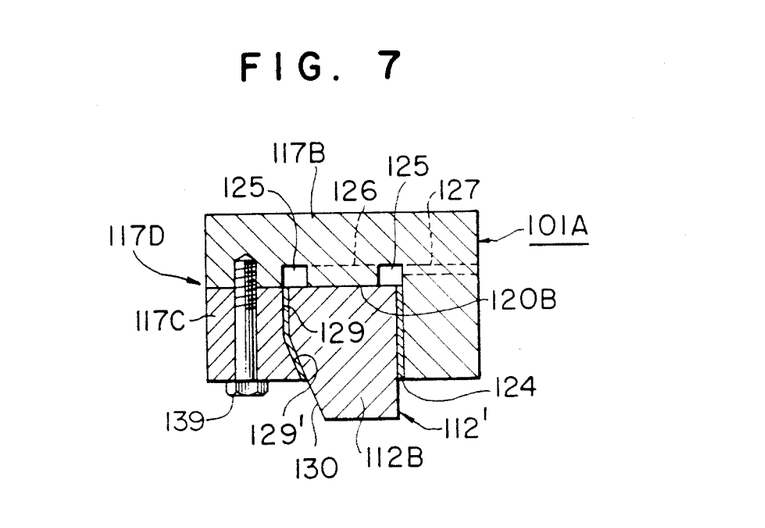
FIG. 7 is a view similar to FIG. 3 but showing a modified seal ring assembly.

FIG. 7 shows a modification 101A of the seal ring assembly 101 having the described construction. In FIG. 7, the same reference numerals are used to denote the same parts or members as those appearing in FIG. 3. The modified seal ring assembly 101A has a ring casing 117D constituted by an annular member 117B which exhibits an inverse L-shaped cross-section when taken along a plane which includes the axis of the assembly 101A, and an annular side wall member 117C secured to the annular member 117B by means of a plurality of bolts 139 such that both members 117A and 117B when assembled together define an annular groove 120B therebetween. The axially outer part of the radially inner wall surface 129 of the side wall member 117C is tapered radially inwardly as at 129'. Each of the segments 112B of the seal ring 112' is partly received in the groove 120B and partly projects from the groove 120B in the axial direction and has a radially outer surface 130 which is tapered in conformity with the taper of the axially outer part 129' of the radially outer surface of the groove 129. As in the case of the embodiment 101 described before, the seal ring assembly 101A is detachably secured to the underside of the seal ring holder 10 by means of bolts which are not shown.

The modification shown in FIG. 7 offers an additional advantage that the segments 112B of the seal ring 112' are more stably held in the groove 120B.

In the described embodiment and the modification, the substantially annular seat face 21 is presented by the first member which is the flange 6 rotatable with the rotor shaft 1 and the seal ring assembly 101 or 101A is detachably held by the seal ring holder 10 which constitutes a second member 10. However, it will be obvious to those skilled in the art that the seal ring assembly 101 or 101A may alternatively be secured to the first member 6 while the second member 10 may provide the seat face 21.

Figure 8:
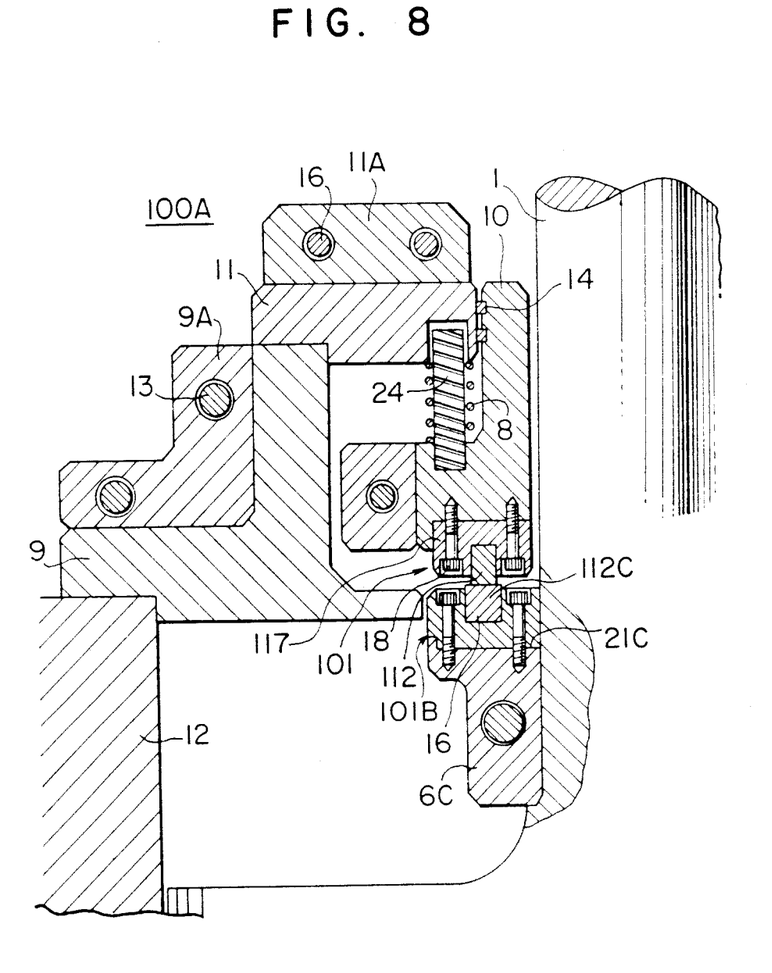
FIG. 8 is a fragmentary sectional view of another embodiment of the shaft seal in accordance with the present invention.

FIG. 8 shows another embodiment of the shaft seal in accordance with the present invention. This shaft seal is generally denoted by numeral 100A and has a first sealing assembly 101 which is secured to the seal ring holder 10 as in the case of the first embodiment. In addition, a second seal ring assembly 101B having a construction substantially the same as the first seal ring assembly 101 is detachably secured to an end face 21C of the flange 6. The seal rings 112 and 112C of these two seal ring assemblies 101 and 101B are held in sliding contact with each other so as to prevent leak of the fluid. The seal ring 112C of the second seal ring assembly 101B may be made from the same material as the seal ring 112 of the first seal ring assembly 101.

In the embodiment shown in FIG. 8, the seal ring 112 and the seal ring 112C have different radial widths in order to ensure the fluid-tightness of the seal even when the rotor shaft 1 of the hydraulic machine vibrates. Namely, the seal ring 112 of the smaller width can be always held in sliding contact at its entire axial end surface with the opposing surface of the seal ring 112C having the greater width, despite any vibration of the rotor shaft 1 of the hydraulic machine. When the seal rings 112 and 112C are made from different materials, it is preferred that the seal ring 112 having the smaller width is made from the softer material.

When the seal ring 112 is made of a ceramic material, it is necessary that the seal face which contacts with the seal ring 112 is made from a similar hard material. The arrangement shown in FIG. 8 is advantageous in that it eliminates the necessity for the entire part of the flange 6 to be formed from a ceramic material which is generally not so resistant to impact.

What is claimed is:

1. A seal ring assembly for use in an end face mechanical shaft seal, comprising:
   an annular ring casing having a substantially annular end face formed therein with a substantially annular groove;
   a seal ring partly received in said groove and secured to said ring casing by an adhesive;
   said seal ring being formed by a plurality of segments each having a substantially arcuate cross-section, substantially cylindrical radially inner and outer surfaces, axial end faces and side faces;
   said segments being disposed in said annular groove with one of the end faces of each segment received in said groove and the other end face being offset from said end face of said ring casing axially outwardly thereof;
   said segments being arranged in circumferentially side-by-side abutting relationship with each other to form said seal ring;
   the other end faces of respective segments being included in a substantially the same plane to provide a substantially smooth and circumferentially substantially continuous sealing surface.

2. A seal ring assembly according to claim 1, wherein said ring casing is formed by a plurality of arcuate sections each having circumferential ends connected with circumferential ends of circumferentially adjacent arcuate ring sections, and wherein the connections between each circumferentially adjacent pair of casing sections are disposed at circumferential positions substantially the same as those where the side faces of at least some of circumferential pairs of said segments are disposed in abutting relationship.

3. A seal ring assembly according to claim 2, wherein said ring casing is formed by a pair of substantially semi-circular casing sections.

4. A seal ring assembly according to claim 1, wherein said segments are each formed of a material selected from a group consisting of carbon, ceramics and resins.

5. A seal ring assembly according to claim 1, wherein annular narrow channels are formed in the bottom of said groove in said ring casing and extend along both side faces of said groove, said narrow channels being communicated with each other through a plurality of passages which extend radially through said ring casing, the radially inner one of said narrow channels being communicated with the radially inner surface of said ring casing through at least one another passage which extends radially through said ring casing.

6. A seal ring assembly according to claim 1, wherein said ring casing is composed of an annular member which exhibits a substantially L-shaped cross-section taken along a plane including the axis thereof and an annular side wall mamber connected to said annular member to define said groove therebetween, the radially inner surface of said side wall member having a tapered surface at its portion adjacent to the axially outer end of said ring casing, said seal ring having a radially outer surface which is tapered substantially in conformity with the taper of said radially inner surface of said side wall member.

7. A seal ring assembly according to claim 1, wherein said adhesive is an epoxy adhesive.

8. An end face mechanical shaft seal for use in hydraulic machineries, comprising:

a substantially annular first member fixed to a rotor shaft of a hydraulic machine for rotation therewith;

an annular seal casing secured in a fluid-tight manner to a casing of said hydraulic machine surrounding said rotor shaft and said first member;

a substantially annular second member connected to said seal casing movably in the axial direction of said rotor shaft but not rotatably relative to said seal casing;

a seal ring assembly detachably fixed to one of said first and second members and presenting a seal face which cooperates with a substantially annular seat face presented by the other of said first and second members to prevent leak of an internal fluid through a gap between said rotor shaft and said seal casing;

means for detachably securing said seal ring assembly to said one of said first and second members; and an elastic means for biasing said second member in said axial direction so as to keep said seal face of said seal ring assembly in sliding and fluid-tight contact with said seat face;

said seal ring assembly including:

an annular ring casing having a substantially annular end face formed therein with a substantially annular groove; and a seal ring partly received in said groove and secured to said ring casing by an adhesive;

said seal ring being formed by a plurality of segments each having a substantially arcuate cross-section, substantially cylindrical radially inner and outer surfaces, axial end faces and side faces;

said segments being disposed in said annular groove with one of the end faces of each segment received in said groove and the other end face being offset from said end face of said ring casing axially outwardly thereof;

said segments being arranged circumferentially side-by-side abutting relationship with each other to form said seal ring;

the other end faces of respective segments being included in a substantially the same plane to provide a substantially smooth and circumferentially substantially continuous sealing surface.

9. A shaft seal according to claim 8, wherein the member which presents said seat face comprises a flange which is fixed to said rotor shaft.

10. A shaft seal according to claim 8, wherein the member which presents said seat face comprises a flange fixed to said rotor shaft, and a second seal ring assembly having a construction substantially the same as the first-mentioned seal ring assembly and detachably secured to a radially extending end surface of said flange, the seal rings of said first and second seal ring assemblies being held in sliding and fluid-tight contact with each other to prevent leak of the fluid.

11. A shaft seal according to claim 10, wherein said seal ring of one of said first and second seal ring assemblies has a radial width which is greater than that of said seal ring of the other of said first and second seal ring assemblies.

12. A shaft seal according to claim 8, wherein said second member comprises a seal ring holder having an "O" ring which provides a fluid-tight seal between said seal ring holder and said seal casing.

13. A shaft seal according to claim 8, wherein said second member comprises a seal ring holder provided with pins extending therefrom in the axial direction thereof and said seal casing has guide holes for receiving said pins so as to guide said pins in the axial direction of said rotor shaft.

14. A shaft seal according to claim 8, wherein said member which presents said annular seat face comprises a flange fixed to said rotor shaft, said flange having a plurality of arcuate sections and bolts by means of which said arcuate sections are united together on the outer peripheral surface of said rotor shaft.

15. A shaft seal according to claim 9, wherein said second member comprises a seal ring holder having a plurality of arcuate sections, lugs provided on both circumferential ends of each section and projecting radially outwardly therefrom, and bolts for connecting adjacent lugs of each adjacent pair of sections thereby uniting said sections together to form said seal ring holder.

* * * * *